US012253840B2

(12) United States Patent
Novodvorskiy

(10) Patent No.: US 12,253,840 B2
(45) Date of Patent: *Mar. 18, 2025

(54) METADATA-BASED SMART HOME AUTOMATION

(71) Applicant: CHARTER COMMUNICATIONS OPERATING, LLC, St. Louis, MO (US)

(72) Inventor: Pavel Novodvorskiy, Aurora, CO (US)

(73) Assignee: Charter Communications Operating, LLC, St. Louis, MO (US)

(*) Notice: Subject to any disclaimer, the term of this patent is extended or adjusted under 35 U.S.C. 154(b) by 212 days.

This patent is subject to a terminal disclaimer.

(21) Appl. No.: 17/743,821

(22) Filed: May 13, 2022

(65) Prior Publication Data

US 2022/0269235 A1    Aug. 25, 2022

Related U.S. Application Data

(63) Continuation of application No. 16/807,842, filed on Mar. 3, 2020, now Pat. No. 11,372,387.

(51) Int. Cl.
*G06F 15/16* (2006.01)
*G05B 19/042* (2006.01)
*H04L 12/28* (2006.01)
*H04L 65/75* (2022.01)
(Continued)

(52) U.S. Cl.
CPC ........ *G05B 19/042* (2013.01); *H04L 12/2803* (2013.01); *H04L 65/75* (2022.05); *H04L 67/141* (2013.01); *H04L 67/60* (2022.05); *G05B 2219/2642* (2013.01)

(58) Field of Classification Search
CPC .. H04L 12/2803; H04L 67/141; G05B 19/042
See application file for complete search history.

(56) References Cited

U.S. PATENT DOCUMENTS 6,856,236 B2    2/2005  Christensen et al.
7,895,257 B2    2/2011  Helal et al.
7,987,490 B2    7/2011  Ansari et al.
(Continued)

OTHER PUBLICATIONS

"Add-on Kodi Callbacks," at https://kodi.wiki/view/Add-on:Kodi_Callbacks.

(Continued)

*Primary Examiner* — Razu A Miah
(74) *Attorney, Agent, or Firm* — THE MARBURY LAW GROUP, PLLC

(57) ABSTRACT

Systems, methods, and devices of the various embodiments include initiating operation of network application logic by detecting control of a network-connected electronic device within a predetermined interval of a previous receipt of instructions related to playing media content that includes content-type metadata that identifies the media content as being a predetermined type of content; and programming an automated routine for initiating the operation of network application logic configured to control the network-connected electronic device triggered by receipt of instruction related to playing the media content when metadata associated with the selected media content includes the content-type metadata that identifies the selected media content as the predetermined type of content.

30 Claims, 8 Drawing Sheets

(51) Int. Cl.
*H04L 67/141* (2022.01)
*H04L 67/60* (2022.01)

(56) References Cited

U.S. PATENT DOCUMENTS

| | | | |
|---|---|---|---|
| 8,375,118 B2 | 2/2013 | Hao et al. | |
| 9,112,849 B1 | 8/2015 | Werkelin Ahlin et al. | |
| 9,699,485 B2 | 7/2017 | Marlow et al. | |
| 9,900,917 B2 | 2/2018 | Kang | |
| 9,954,679 B2 | 4/2018 | Nguyen et al. | |
| 10,464,206 B2 | 11/2019 | Frisby et al. | |
| 10,498,611 B1 | 12/2019 | Kloberdans et al. | |
| 2004/0215778 A1 | 10/2004 | Hesse et al. | |
| 2006/0218244 A1 | 9/2006 | Rasmussen et al. | |
| 2008/0168523 A1* | 7/2008 | Ansari | H04L 65/1108 725/105 |
| 2009/0216855 A1 | 8/2009 | Lang et al. | |
| 2010/0146423 A1 | 6/2010 | Duchene et al. | |
| 2010/0191829 A1 | 7/2010 | Cagenius | |
| 2010/0332994 A1 | 12/2010 | Istvan et al. | |
| 2011/0035287 A1* | 2/2011 | Fox | G06Q 30/02 705/26.1 |
| 2012/0130513 A1 | 5/2012 | Hao et al. | |
| 2012/0233639 A1 | 9/2012 | Zott et al. | |
| 2013/0145048 A1* | 6/2013 | Lee | H04L 12/2836 709/248 |
| 2014/0049693 A1 | 2/2014 | Selim et al. | |
| 2014/0195675 A1 | 7/2014 | Silver | |
| 2014/0310739 A1* | 10/2014 | Ricci | G06F 3/013 725/75 |
| 2015/0189386 A1 | 7/2015 | Golyshko et al. | |
| 2015/0189387 A1 | 7/2015 | Golyshko et al. | |
| 2015/0189390 A1 | 7/2015 | Sirpal et al. | |
| 2016/0187862 A1 | 6/2016 | Nayak | |
| 2016/0309954 A1 | 10/2016 | Lentzitzky et al. | |
| 2018/0323991 A1 | 11/2018 | Segal et al. | |
| 2019/0025782 A1 | 1/2019 | Mathews et al. | |
| 2019/0028338 A1 | 1/2019 | Kozura et al. | |
| 2019/0146442 A1 | 5/2019 | Cirino | |
| 2019/0158353 A1 | 5/2019 | Johnson et al. | |
| 2020/0089464 A1 | 3/2020 | Curtis | |

OTHER PUBLICATIONS

"Webhooks—Plex Support," at https://support.plex.tv/articles/115002267687-webhooks/.

"Automate Your Home Theater Lights From The Cloud," at https://hackernoon.com/automate-your-home-theater-lightsfrom-the-cloud-cdb29a8685a6.

"Question Want to dim the lights when my TV starts playing . . . ," at https://www.reddit.com/r/homeautomation/comments/7ve3pd/want_to_dim_the_lights_when_my_tv_starts_playing/.

"Synchronize your lights with movies and series," at https://www2.meethue.com/en-us/entertainment/video.

* cited by examiner

METADATA-BASED SMART HOME AUTOMATION

RELATED APPLICATIONS

This application is a continuation of U.S. patent application Ser. No. 16/807,842 entitled "Metadata-Based Smart Home Automation" filed Mar. 3, 2020, the entire contents of which is hereby incorporated by reference for all purposes.

BACKGROUND

With the advent of so-called "smart devices," which are network-connected electronic devices that can operate interactively and semi-autonomously, users of such smart device have introduced automation to many aspects of their daily lives, particularly in their homes. Smart devices may be programmed by users to automatically control appliances, lights, and other electronic devices. These smart devices may be triggered by an input from a computing device (e.g., a mobile phone) or other network-connected electronic device. While such automation has lead to many conveniences, the inputs from computing devices that trigger such programed automatic controls do not take full advantage of additional elements of information available to some of those network-connected electronic devices.

SUMMARY

Various embodiments describe methods, systems, and devices for initiating operations of network application logic. Various embodiments include initiating operation of network application logic by receiving an instruction related to a presentation of a selected media content configured to be consumed by a target consumer. The various embodiments further include determining whether the selected media content includes content-type metadata that identifies the selected media content as a predetermined type of content, and initiating operation of network application logic configured to control a network-connected electronic device in response to determining the selected media content includes the content-type metadata that identifies the selected media content as the predetermined type of content.

In various embodiments, the received instruction may include a command to play, stop, pause, resume, fast-forward, rewind, or skip a segment of the selected media content. The various embodiments further include initiating operation of network application logic may include transmitting a signal to the network-connected electronic device. The predetermined type of content may be one of a plurality of content types designated for initiating operations of network application logic. The operation of network application logic may activate a network-connected switch. The network-connected electronic device may include, for example, a light that is controlled by the operation of network application logic.

Some embodiments may further include determining which operation of network application logic may be associated with the received instruction and the selected media content. The various embodiments may further include an execution time for initiating the operation of network application logic may be determined based on the received instruction, wherein the operation of network application logic is initiated at the execution time. In addition, control of the network-connected electronic device may be detected within a predetermined interval of a previous receipt of instructions related to playing media content that includes the content-type metadata that identifies the media content as being the predetermined type of content. An automated routine may be programmed for initiating the operation of network application logic configured to control the network-connected electronic device triggered by receipt of the received instruction related to playing the media content when metadata associated with the selected media content includes the content-type metadata that identifies the selected media content as the predetermined type of content. Also, a determination may be made as to whether the operation of network application logic is scheduled for execution. A schedule for executing the operation of network application logic may be updated in response to determining the operation of network application logic is scheduled for execution.

Further aspects include a computing device including a processor configured with processor-executable instructions to perform operations of any of the methods summarized above. Further aspects include a non-transitory processor-readable storage medium having stored thereon processor-executable software instructions configured to cause a processor to perform operations of any of the methods summarized above. Further aspects include a processing device for use in a computing device and configured to perform operations of any of the methods summarized above.

BRIEF DESCRIPTION OF THE DRAWINGS

The accompanying drawings, which are incorporated herein and constitute part of this specification, illustrate exemplary embodiments, and together with the general description given above and the detailed description given below, serve to explain the features of various embodiments.

DETAILED DESCRIPTION

Figure 1A:
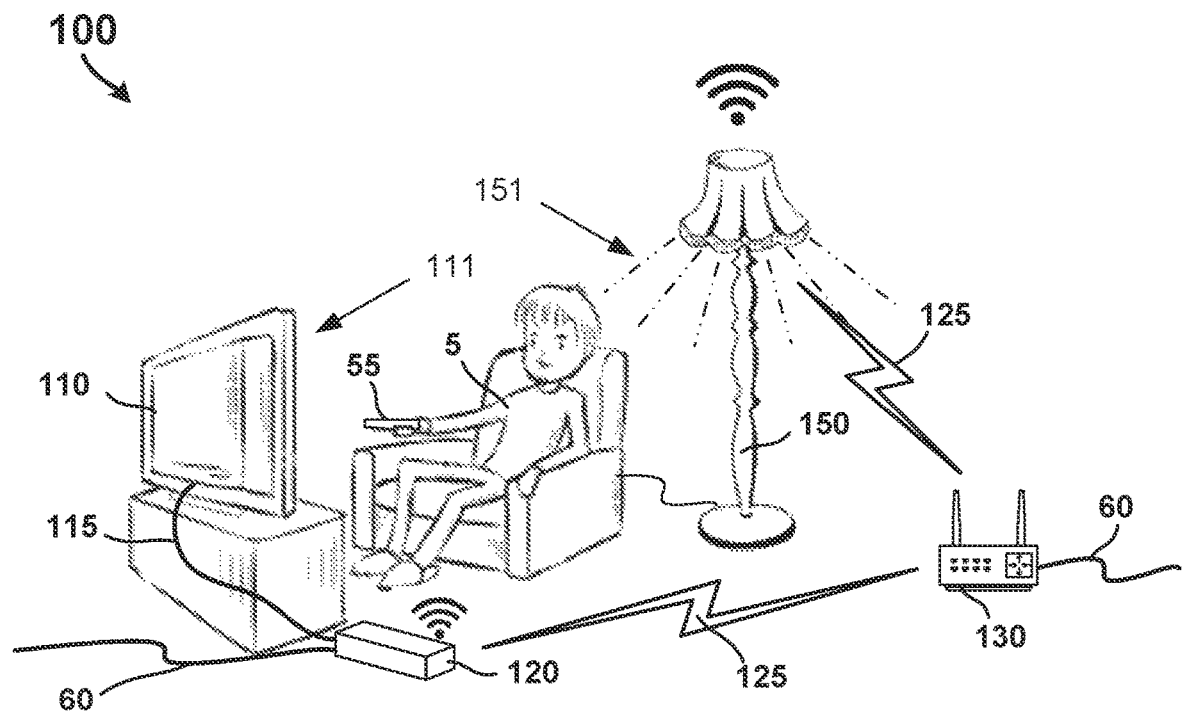
FIGS. 1A and 1B are schematic diagrams of an example environment including a computing device suitable for use with various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The various embodiments may provide advanced levels of home automation using the metadata included with a media content (e.g., a DVD movie, streaming service, etc.) to control network-connected electronic device(s) (i.e., smart devices) in response to specific media content playing conditions. In the various embodiments, a user may set up certain settings for their smart devices that may be triggered by very specific circumstances associated with playing media content, while not triggering those same smart devices under similar but different circumstances. For example, a network-connected light in a room may dim when a sporting event starts on television, but those same lights may not dim when the news comes on. Similarly, those network-connected lights may turn off when an action movie starts, but not when a comedy movie begins. Also, the bass level on a network-connected stereo may be turned up when a concert broadcast begins, but not when other music or audio files are playing. Using a set-top-box or other internet protocol streaming device that receives instructions related to playing a media content (e.g., play, pause, rewind, etc.), various embodiments may determine whether metadata associated with the media content identifies the media content as a predetermined type of content that is configured to control a designated network-connected electronic device in a particular manner under predetermined circumstances.

As used herein, the term "media content" refers to information and expressions thereof that are expressed through a medium or multimedia, including but not limited to audio and/or video recordings or streaming services broadcast or otherwise transmitted to end-users and/or consumers. Media content may include multimedia content, a video from a video-sharing website/service or social network, podcasts, news, music, or a television program, show, series, etc., that is provided by a programmer (e.g., Turner Broadcasting®, ESPN®, Disney®, Viacom®, etc.) to a content distributor network (e.g., Charter®, Comcast®, DirecTV®, Sling® TV etc.) for Internet Protocol (IP) streaming (e.g., adaptive bit rate (ABR) streaming, such as Apple Hypertext Transfer Protocol (HTTP) Live Streaming (Apple HLS), Dynamic Adaptive HTTP (DASH), etc., or any other type IP streaming) on a channel provided by the content distributor network and associated with that programmer. Programmers (e.g., Turner Broadcasting, ESPN, etc.) may encode (e.g., using metadata) and package content for delivery by the content distributor networks to consumers (also referred to as customers or viewers) via IP streaming services offered by the content distributor networks (e.g., Charter®, Comcast®, DirecTV®, Sling® TV etc.). Through the consumer's computing device, a consumer (also referred to as a customer, viewer, or user) may select media content offered by the consumer's respective content distributor network (i.e., the content distributor network providing service to the consumer's computing device) to output (i.e., play, view, consumed) the media content provided by the programmer.

As used herein, the term "metadata" refers to a set of data that describes and gives information about a particular media content. In addition, the term "content-type metadata" refers to an element of metadata that identifies the media content with a category of media content or other media content with common characteristics.

As used herein, the term "computing device" is used to refer to any one or all of satellite or cable set top boxes, smart remote control devices (i.e., television remote controls with sufficient processing capabilities), laptop computers, rack mounted computers, routers, cellular telephones, smart phones, smart watches, personal or mobile multi-media players, personal data assistants (PDAs), personal computers, tablet computers, smart books, palm-top computers, desk-top computers, wireless electronic mail receivers, multimedia Internet enabled cellular telephones, wireless gaming controllers, streaming media players (such as, Sling® or ROKU®), smart televisions, DVRs, modems, and similar electronic devices which include a programmable processor and memory and circuitry for providing the functionality described herein.

The various embodiments are described herein using the term "server" to refer to any computing device capable of functioning as a server, such as communications server, a name server, a master exchange server, web server, mail server, document server, database server, route server, content server, or any other type of server. A server may be a dedicated computing device or a computing device including a server module (e.g., running an application which may cause the computing device to operate as a server). A server module (e.g., server application) may be a full function server module, or a light or secondary server module (e.g., light or secondary server application) that is configured to provide synchronization services among the dynamic databases on computing devices. A light server or secondary server may be a slimmed-down version of server-type functionality that can be implemented on a computing device thereby enabling it to function as a server only to the extent necessary to provide the functionality described herein.

In various embodiments, a connected set-top box or other internet protocol (IP) device may be connected to a home automation system (i.e., a smart home) and control various devices operating inside or in close proximity to the house based on the currently watched program and actions taken related to that currently watched program. For example, the system may dim or turn off the lights in the room when a target customer (i.e., a user or viewer) is watching a movie and keep track of user actions (pause, play, rewind, restart) to turn the lights back on at the right time. On premises, the target customers may have a set-top box and a switch (which may be embedded in the set-top box), that will enable automation related to one or more smart devices connected to the home automation system. In various embodiments, new devices that come online to the home automation system may register itself with a decision engine, locally and/or in the cloud) and store a set of rules that the target consumer may use to modify and/or update. The decision engine may analyze metadata from various sources for the media content (i.e., programs and video on-demand assets) available to the target consumer. Once the switch is turned on, the set-top box may send data about triggering events (e.g., instructions or commands transmitted from the remote control used by the target consumer) to the decision engine. In various embodiments, the decision engine may make determinations regarding actions that need to be taken and the execution time of those actions. If a triggering event is detected with regard to a particular media content, the decision engine may evaluate whether or not it should update scheduled event or possibly send an immediate action to one or many smart devices connected to a home automation system.

Figure 1B:
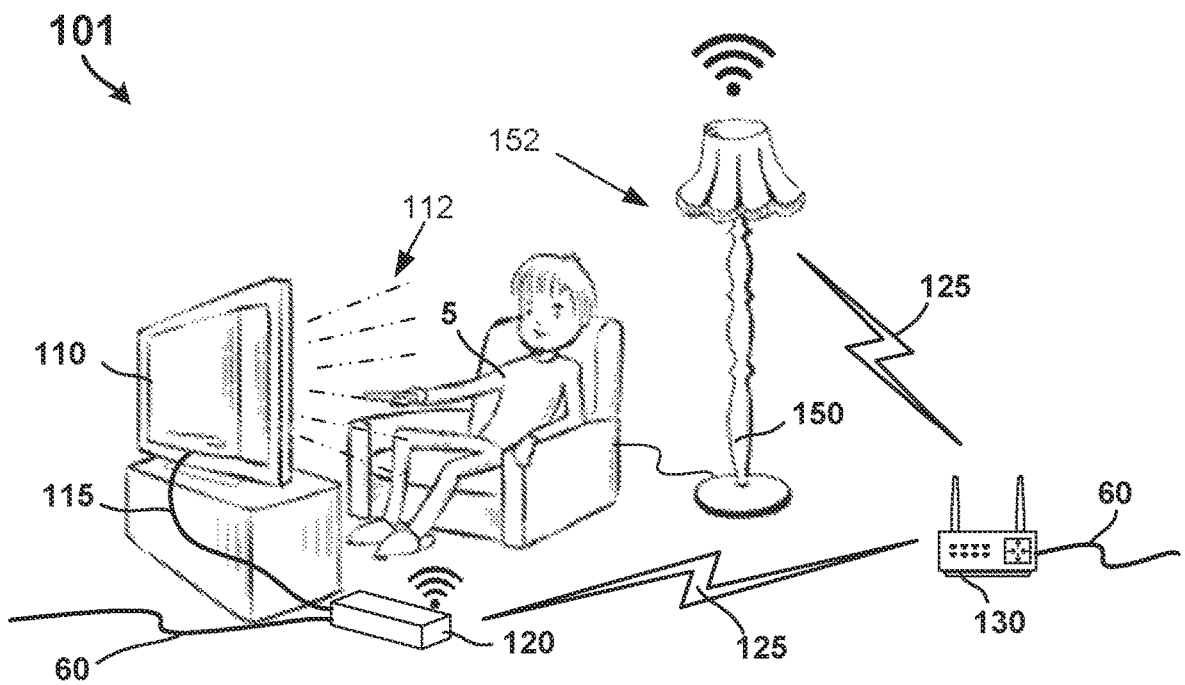

FIGS. 1A and 1B illustrate a schematic diagram of an environment 100 containing a computing device 120 configured for initiating operation of network application logic using metadata associated with a media content in accordance with various embodiments. The environment 100 includes a target consumer 5 preparing to watch and watching media content on a television 110, provided via the computing device 120. In addition, the environment 100 includes elements of a home automation system or so-called smart-household, including a smart-lighting system 150 controlled through a home network hub or router 130.

The television 110 may be coupled to the computing device 120 through a wired connection 115. Alternatively, or additionally, the television 110 may be coupled to the computing device 120 by a wireless connection (e.g., Wi-Fi, Bluetooth, etc.). The television 110 may configured to present media content supplied via the computing device 120 from various sources by way of another wired connection 60, a wireless connection, or a combination thereof. Also, the television 110 works in conjunction with a remote controller 55, which may be used by the target consumer 5 to control functions of the television 110 (e.g., volume, power, etc.) and/or the computing device 120, such as channel changing and/or operations related to the presentation of media content (e.g., play, stop, pause, resume, fast-forward, rewind, or skip).

Figure 2:
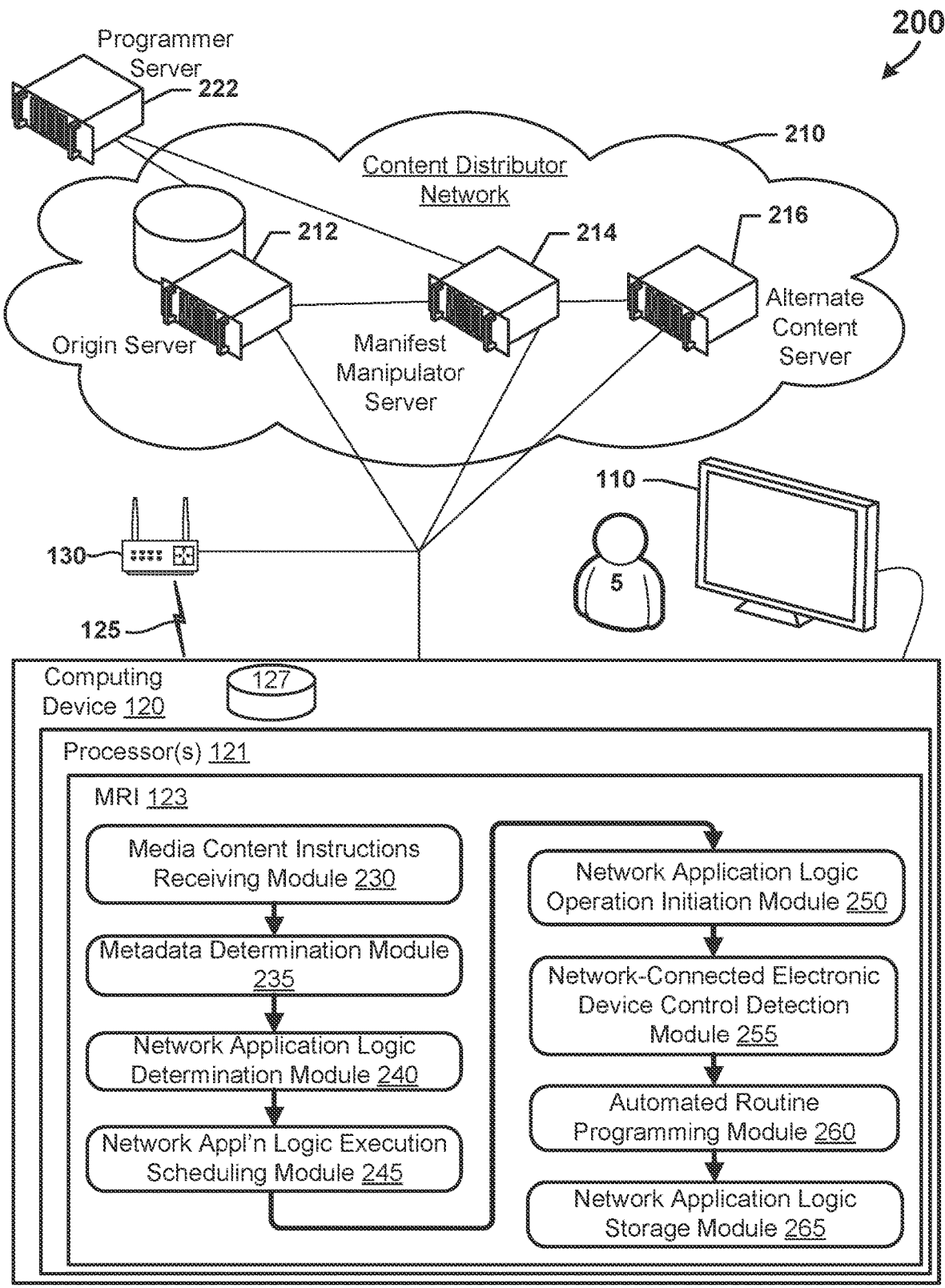
FIG. 2 is a system block diagram of an IP network for distributing media content suitable for use with various embodiments.

The computing device 120 is illustrated as television set-top box, but may represent one or more computing devices including local computing devices (e.g., a television, set-top box, gaming console, personal computer, laptop, tablet, and the like), distributor network computing devices (e.g., origin server, manifest manipulator server, alternate content server, and the like illustrated as 212, 214, and 216 in FIG. 2), programmer computing devices, guide vendor computing devices, and/or other remote computing devices.

The router 130 may be configured to communicate with the computing device 120, the smart-lighting system 150, and/or other home automation electronic devices through a wireless connection 125 (e.g., Wi-Fi, Bluetooth, etc.) and/or through one or more wired connections 60. In addition, the router 130 may be configured to reach the Internet or backhaul network through the wired connection 60 and/or through one or more wireless connections.

In accordance with various embodiments, individual ones of the computing device 120, the router 130, and/or other electronic devices coupled through a local (i.e., in-home) network may store, maintain, and execute applications different from the applications stored, maintained and executed by other devices in the local network. Some of those applications may use anonymous functions (e.g., a lambda function), such as many home automation functions, that include application logic for initiating a task programmed to automatically occur in response to an associated trigger being detected or initiated within the network. The anonymous functions may be a third-party application that binds the computing device 120, router 130, other local electronic devices, or even a remote server in the cloud-based backend to execute application logic for initiating a task in response to a particular trigger being detected.

For example, the anonymous function may be part of a home automation program that turns off one or more lights (i.e., initiates a task), using the smart-lighting system 150, in response to a movie (i.e., media content) starting to play on the television 110. The target consumer 5 may command the computing device 120 to start playing a select movie by pressing "Play" using the remote controller 55 or other control device, which transmits a play instruction to the computing device 120. The television 110 may display a prompt 111 for the target consumer 5 to select, which corresponds to a play-function. Up until that time, the smart lighting system 150 may have one or more lights turned on 151. A processor of the computing device configured with a home automation application may interpret receipt of the play-function instruction as a trigger for initiating the operation of network application logic. In particular, under the appropriate circumstances in environment 101, the play-function instruction may not only start playing 112 the movie, but also transmit a task initiation signal to the smart-lighting system 150 to turn the lights off 152. Similarly, the processor may interpret receipt of the stop instruction as a trigger for stopping the movie and transmitting a task initiation signal to the smart-lighting system 150 to turn the lights back on to emit light 151.

As another example, the anonymous function may be integrating with a smart-audio system, such as a surround sound or home theater system that works with a home automation program. Using the smart-audio system, a user may pre-program settings for bass, tremble, volume, etc., which may be different for media content of different types. In this way, the smart-audio system may have one set of pre-programmed settings for movies or movies of a particular type, while having another set of pre-programmed setting for television shows, series, or other programing. Also, the anonymous function may be configured to control both the smart-lighting system 150 as well as the smart-audio system (i.e., multiple functions/commands), so both the lighting and sound may be set properly depending on the content-type metadata and the received instruction from the target consumer 5. In addition, the home automation program may include certain rules and/or a conflict resolution logic, so it can handle conflicting instructions and/or content-type metadata. For example, one anonymous function may be scheduled to trigger when a play instruction is received for media content having content-type metadata that indicates the content is a movie, while the same system may have a different anonymous function for comedies. In this way, the rules or conflict resolution system may handle overlapping or conflicting situations, so one coherent anonymous function is triggered.

FIG. 2 illustrates a system block diagram of an IP network 200 suitable for use with the various embodiments. With reference to FIGS. 1-2, the IP network 200 may include one or more programmer servers 222, one or more content distributor networks 210, and consumer computing devices 110, 120, 130. The programmer servers 222, content distributor networks 210, and consumer computing devices 110, 120, 130 may be connected together via one or more wired and/or wireless connections, such as connections to wired and/or wireless networks (e.g., connections to the Internet), and via those connections may exchange data with one another. In various embodiments, a content distributor network 210 may include various interconnected computing devices, such as an origin server 212, manifest manipulator server 214, and alternate content server 216. Via their connections (wired and/or wireless) with one another, the origin server 212, the manifest manipulator server 214, and the alternate content server 216 may exchange data with one another. In various embodiments, the content distributor network 210 may be operated by a content distributor (e.g., Charter Communications®, Comcast®, DirecTV®, Sling® TV etc.) and may provide media content, such as television services via IP streaming (e.g., ABR streaming, such as Apple HLS, DASH, etc., or any other type IP streaming) to consumers, such as the target consumer 5, via one or more of his or her consumer computing devices 110, 120, 130. As an example, computing device 120 may be a streaming media player (e.g., a ROKU®) or DVR connected to computing device 110 which may be a television. Computing device 120 may be optional as computing device 110 may itself connect to the content distributor network 210. For example, computing device 110 may be a smart television. As another example, computing device 110 may be a laptop computer, which may be connected with a wired (e.g., Ethernet) or wireless (e.g., Wi-Fi or Bluetooth®) to the content distributor network 210.

In various embodiments, the programmer server 222 may be a server of a programmer (e.g., Turner Broadcasting®, ESPN®, Disney®, Viacom®, etc.) that provides content for viewing by consumers, such as the target consumer 5, via the content distributor network 210. For example, the programmer server 222 may provide programmer content (i.e., media content) to the origin server 212. An encoder and packager at the programmer server 222 or origin server 212 may format the programmer content and the origin server 212 may store the programmer content (e.g., media content along with content-type metadata) for IP streaming. While the origin server 212 is illustrated in FIG. 2 as part of the content distributor network 210, the origin server 212 may be a server of a separate content delivery network (CDN) service, such as Akamai®, Amazon®, Netflix®, Hulu®, Vudu®, HBOGo®, etc., to which the content distributor network 210 operator or programmer offloads content storage and delivery.

The manifest manipulator server 214 may be configured to generate manifest files, such as a .mpd type files for DASH, .m3u8 type files for Apple HLS, etc., that describe the programmer content provided by the programmer server 222 and stored at the origin server 212. The manifest files may be stored at the origin server 212 and may defined the segments of content provided by a programmer server 222 as well as segments for advertisements to be displayed according to an ad plan for a given content or channel. Manifest files may be pre-generated by the manifest manipulator server 214 based on a program guide or similar service. In various embodiments, the manifest manipulator server 214 may be configured to modify the pre-generated manifest files to generate manifest files for programmer alternate content or the content recommendations. The manifest manipulator server 214 may provide manifest files to requesting ones of the consumer computing devices 110, 120, 130. The consumer computing devices 110, 120, 130 may use the manifest files with the updated metadata to retrieve and play media content.

In various embodiments, the computing device 120 may include one or more memory storage devices 127 and one or more processors 121. The computing device 120 and/or the processors 121 may be configured by machine-readable instructions (MRI) 123. The MRI 123 may include one or more instruction modules. The instruction modules may include computer program modules. The instruction modules may include one or more of a media content instructions receiving module 230, a metadata determination module 235, a network application logic determination module 240, a network application logic execution scheduling module 245 ("Network Appl'n Logic Execution Scheduling Module"), a network application logic operation initiation module 250, a network-connected electric device control detection module 255, an automated routine programming module 260, a network application logic storage module 265, or other instruction modules.

The media content instructions receiving module 230 may be configured to receive an instruction related to a presentation of media content configured to be consumed by a target consumer. For example, the target consumer 5 using the remote controller 55 or other means may transmit an instruction, which is received by the media content instructions receiving module 230, that includes a command to play, stop, pause, resume, fast-forward, rewind, or skip a segment of the media content.

The metadata determination module 235 may be configured to determine whether metadata associated with the media content identifies the media content as a predetermined type of content. For instance, the metadata determination module 235 may be configured to determine whether a selected media content includes metadata that identifies the selected media content as a particular type of content (i.e., content-type metadata). When a selected media content does not include content-type metadata, the metadata determination module 235 may not trigger network application logic in response thereto. The predetermined type of content may be one of a plurality of content types designated for initiating operations of network application logic. Thus, when a selected media content includes content-type metadata, the metadata determination module 235 may compare the included content-type metadata to a table (i.e., a list) of predetermined types of content for which network application logic should be triggered.

The table may be stored in the memory storage device 127 or accessed from other memory. If the identified content-type metadata is included in the table of predetermined types of content, then the metadata determination module 235 may trigger network application logic configured to control a network-connected electronic device in response thereto. Alternatively, if the identified content-type metadata is included in the table of predetermined types of content, then the metadata determination module 235 may convey the identified content-type metadata and/or additional information to the network application logic determination module 240 for determining which network application logic, if any, should be executed. If the identified content-type metadata is not included in the table of predetermined types of content, then the metadata determination module 235 may not trigger execution of network application logic in response thereto.

For example, in response to the media content instructions receiving module 230 receiving a command to start playing a selected media content, the metadata determination module 235 may determine that the selected media content includes content-type metadata that identifies the selected media content as a "movie." In addition, a table of predetermined types of content may include "movie" as one of the predetermined types of content. The same table may also indicate that a command to start playing for media content identifies as a movie should trigger a smart-lighting system (e.g., 150) to turn its lights off or dim the lights. In response thereto, the metadata determination module 235 may trigger network application logic configured to control the smart-lighting system to shut off lights or dim lights. In contrast, in response to the media content instructions receiving module 230 receiving a command to fast-forward the selected media content, the metadata determination module 235 may determine no network application logic needs to be triggered because no network application logic is associated with the fast-forward command.

The network application logic determination module 240 may be configured to determine whether any operation of network application logic is associated with the received instruction and the selected media content, at least based on the content-type metadata. For instance, the network application logic determination module 240 may scan a list of operations of network application logic to see whether any should be triggered. If the identified content-type metadata and the received instruction are associated on the list with at least one operation of network application logic, then the network application logic determination module 240 may initiate operation of that network application logic, which may be configured to control a network-connected electronic device in response thereto. Otherwise, the network application logic determination module 240 may not initiate operation of any network application logic in response thereto.

The network application logic execution scheduling module 245 may be configured to determine when to initiate (i.e., an execution time) the operation of network application logic based on the received instruction and the content-type metadata. Once determined, the operation of network application logic may be initiated at the execution time. For example, if the received instruction is a play command and the content-type metadata identifies a movie, the execution time may be the current time, since the lights should be turned off immediately. While the smart-lighting system 150 may be configured to slowly dim the lights off, rather than quickly turning them completely off, the process of shutting them off may be initiated at the execution time, which in this instance is immediately.

The network application logic operation initiation module 250 may be configured to initiate operation of network application logic configured to control a network-connected electronic device in response to determining the metadata associated with the media content identifies the media content as the predetermined type of content. In particular, the network application logic operation initiation module 250 may initiate the operation of network application logic determined by the network application logic determination module 240 at the execution time determined by the network application logic execution scheduling module 245. The initiation of the network application logic may include transmitting a signal to a network-connected electronic device. The network-connect electronic device may include a light (e.g., smart-lighting system 150) that is controlled by the operation of the network application logic. Additionally, or alternatively, the operation of network application logic may activate a network-connected switch.

The network-connected electric device control detection module 255 may be configured to detect control of a network-connected electronic device within a predetermined interval of a previous receipt of instructions related to playing media content having metadata that identifies the previous media content as the predetermined type of content. The detection of control of a network-connected electronic device may be used with machine-learning to program and/or suggest the programming of new automated routines that may be initiated in conjunction with received instructions and content-type metadata, in accordance with various embodiments. The detection of control of a network-connected electronic device may allow the network-connected electric device control detection module 255 to determine when a network-connected electronic device (e.g., smart-lighting system 150) is activated/deactivated, has a setting changed, or operated is some way that is electronically detectable and possibly tied to other network events (i.e., triggers). The computing device 120 may actively poll one or more network-connected electronic devices for indications of control or the one or more network-connected electronic devices may be configured to report indications of such control to the computing device, which indications of control the network-connected electric device control detection module 255 may use accordingly.

Before concluding that a detected control of a network-connected electronic device should be programmed as part of an automated routine, the network-connected electric device control detection module 255 may also determine whether the detected control of the network-connected electronic device occurred within a predetermined interval of receipt of instructions related to playing media content having metadata that identifies the previous media content as being a particular type of content. The proximity in time of detecting control of the network-connected electronic device and receipt of instructions related to media content having particular content-type metadata may suggest a connection between the two occurrences. Also, since only one occurrence of a detected control within a short time interval of receipt of an instruction may not warrant programming or suggesting the programming of an automated routine, the network-connected electric device control detection module 255 may also require a predetermined repetition (e.g., three times) of the occurrence of the detected control within the short time interval of receipt of the instruction before programming or suggesting the programming of the automated routine.

For example, if the network-connected electric device control detection module 255 detects that the last three times an instruction to stop or pause playing a movie was shortly followed or preceded by the smart-lighting system 150 turning the lights on, such repeated activity may warrant the programming or the suggestion to program a routine that performs those operations automatically. Thus, in response to this repeated detection, the network-connected electric device control detection module 255 may output a prompt, such as through an application on the television (computing device 110), a smart-phone app, or other means, for a user (e.g., the target consumer 5) to decide whether such an automated routine should be programmed. Alternatively, the automated routine may be programmed (e.g., using the automated routine programming module 260) with no user prompt and the user may be provided with an option to subsequently remove or delete the routine if desired.

The automated routine programming module 260 may be configured to program an automated routine for initiating the operation of network application logic configured to control the network-connected electronic device triggered by receipt of the instruction related to playing the media content when the metadata associated with the media content identifies the media content as the predetermined type of content. The automated routine programming module 260 may be used with machine-learning to program new automated routines that may be initiated in conjunction with received instructions and specific content-type metadata, in accordance with various embodiments.

Additionally, before concluding that a detected control of a network-connected electronic device should be programmed as part of a new automated routine or suggested for programming through a prompt to the user, the network-connected electric device control detection module 255 and/or the automated routine programming module 260 may also determine whether the same or substantially the same automated routine is already programmed. If no similar automated routine is already programmed, the network-connected electric device control detection module 255 may output the prompt for the user or direct the automated routine to be programmed. However, if a similar automated routine is already programmed, the network-connected electric device control detection module 255 and/or the automated routine programming module 260 may further determine any differences between them. For example, if a schedule (i.e., the timing of the operations) of the already programmed automated routine is different from a schedule or proposed schedule of the new automated routine, the network-connected electric device control detection module 255 and/or the automated routine programming module 260 may output a prompt for the user to resolve the scheduling differences. Once user input is received that resolves the scheduling differences in a way that changes the schedule, the schedule for executing the operation of network application logic may be updated in response thereto.

The network application logic storage module 265 may be configured to store in memory (e.g., memory storage devices 127) the programming or updates to the programming of the automated routine generated by the automated routine programming module 260.

Figure 3A:
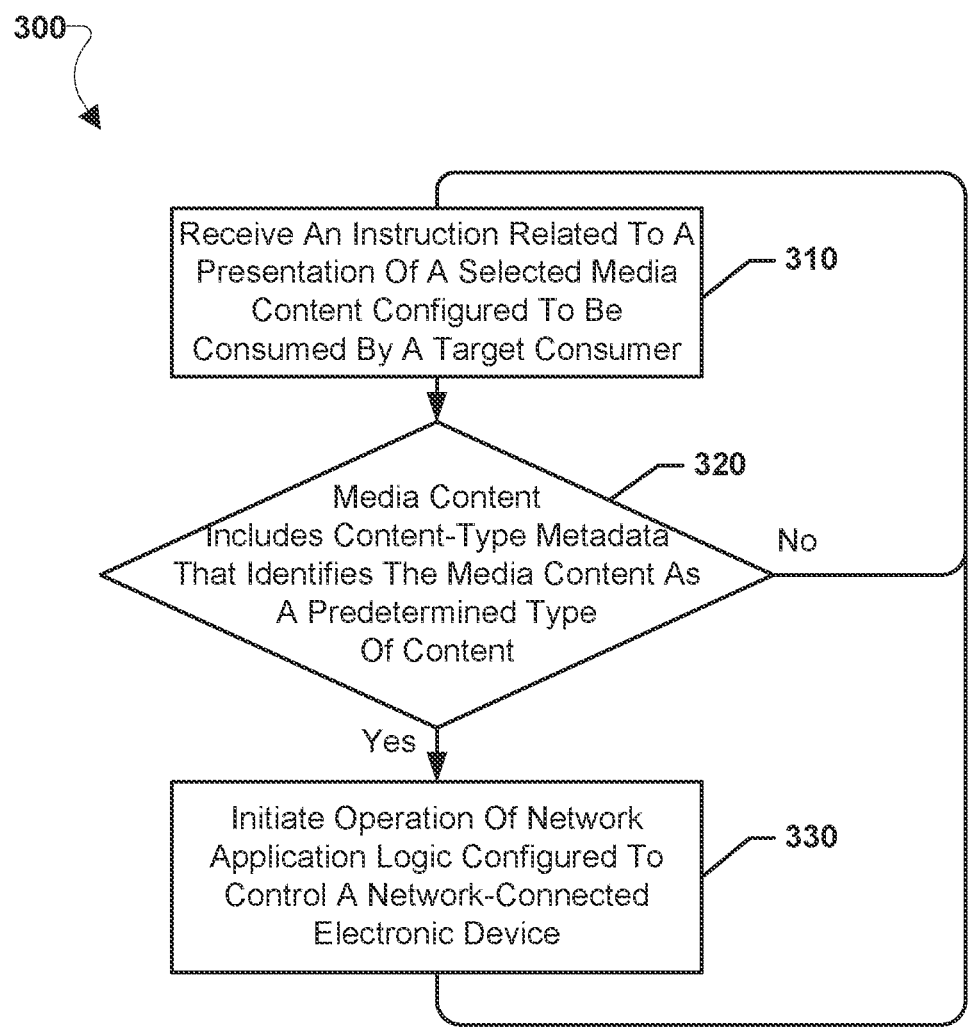
FIGS. 3A-3E are process flow diagrams illustrating embodiment methods for making content recommendations to a target consumer suitable for use with various embodiments.

FIG. 3A illustrates an embodiment method 300 for initiating operation of network application logic by a processor of a computing device, in accordance with various embodiments. With reference to FIGS. 1-3A, the operations of the method 300 may be performed by a processor (e.g., 121) of a computing device 120 (e.g., 110, 120, 130) or server (e.g., programmer server 222, alternate content server 216, manifest manipulator server 214, origin server 212).

In block 310, the processor may receive an instruction related to a presentation of a selected media content configured to be consumed by a target consumer. The instruction may be received from a remote controller (e.g., 55) or other consumer computing device that configured to transmit such an instruction. The instruction may be received at the media content instructions receiving module (e.g., 230). The instruction may include a command, such as one to play, stop, pause, resume, fast-forward, rewind, or skip a segment of the media content. In addition, the instruction may be associated with a particular media content selected by the target consumer (e.g., 5) or a currently active media content (e.g., playback is in queue to begin or in progress).

In determination block 320, the processor may determine whether the media content includes content-type metadata that identifies the media content as a predetermined type of content. The determination in determination block 320 may be performed by the metadata determination module (e.g., 235). To make the determination in determination block 320, the processor may access the metadata included with the selected media content and determine whether content-type metadata is included. The predetermined type of content may be one of a plurality of content types designated for initiating operations of network application logic.

In response to determining that the media content does not include content-type metadata that identifies the media content as a predetermined type of content (i.e., determination block 320="No"), the processor may repeat the operations in block 310 to await receipt of an additional instruction.

In response to determining that the media content includes content-type metadata that identifies the media content as a predetermined type of content. (i.e., determination block 320="Yes"), the processor may initiate operation of network application logic configured to control a network-connected electronic device in block 330.

In block 330, the processor may initiate operation of network application logic configured to control a network-connected electronic device. The initiation of the operation of network application logic in block 330 may be performed by the network application logic operation initiation module (e.g., 250). To initiate the operation of network application logic, the processor may transmit a command or other signal to the network-connected electronic device (e.g., the smart-lighting system 150) or an intermediate computing device (e.g., the router 130). In addition, or alternatively, the initiation of the network application logic may include transmitting a signal to a network-connected electronic device. The network-connect electronic device may include a light (e.g., smart-lighting system 150) that is controlled by the operation of the network application logic. Further, the operation of network application logic may activate a network-connected switch.

Following the operations in block 330, the processor may await receipt of an additional instruction related to the presentation of the selected media content configured to be consumed by the target consumer before repeating the operations in block 310.

Figure 3B:
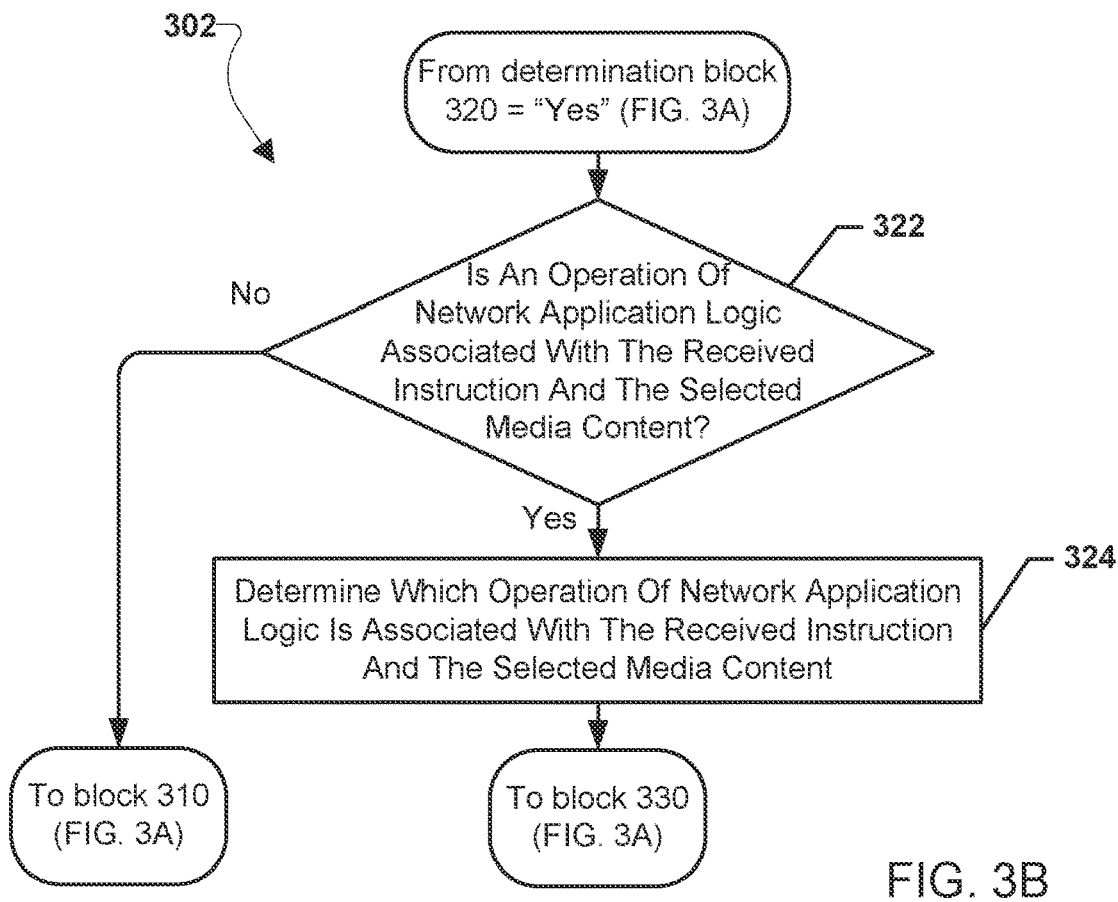

FIG. 3B illustrates an embodiment method 302 of example operations that may be performed as part of the method 300 (FIG. 3A) for initiating operation of network application logic. With reference to FIGS. 1-3B, the operations of method 302 may be performed by the processor (e.g., 121) of the computing device (e.g., 110, 120, 130) or server (e.g., programmer server 222, alternate content server 216, manifest manipulator server 214, origin server 212).

In some implementations, following the operations of determination block 320 (FIG. 3A) in which the processor determines that the media content includes content-type metadata that identifies the media content as a predetermined type of content. (i.e., determination block 320="Yes"), the processor may determine whether an operation of network application logic is associated with the received instruction and the selected media content in determination block 322. The determination in determination block 322 may be performed by the network application logic determination module (e.g., 240). To make the determination in determination block 322, the processor may access a network application logic database that maintains data for one or more elements of suitable network application logic.

In response to determining that no operation of network application logic is associated with the received instruction and the selected media content (i.e., determination block 322="No"), the processor may await receipt of an additional instruction in order to repeat the operations in block 310 (FIG. 3A).

In response to determining that an operation of network application logic is associated with the received instruction and the selected media content (i.e., determination block 322="Yes"), the processor may determine which operation of network application logic is associated with the received instruction and the selected media content in block 324.

In block 324, the processor may determine which operation of network application logic is associated with the received instruction and the selected media content. The determination in block 324 may be performed by the network application logic determination module (e.g., 240). To make the determination in block 324, the processor may access the network application logic database that maintains data for one or more elements of suitable network application logic. Following the operations in block 324, the processor may initiate operation of network application logic configured to control the network-connected electronic device in block 330 (FIG. 3A).

Figure 3C:
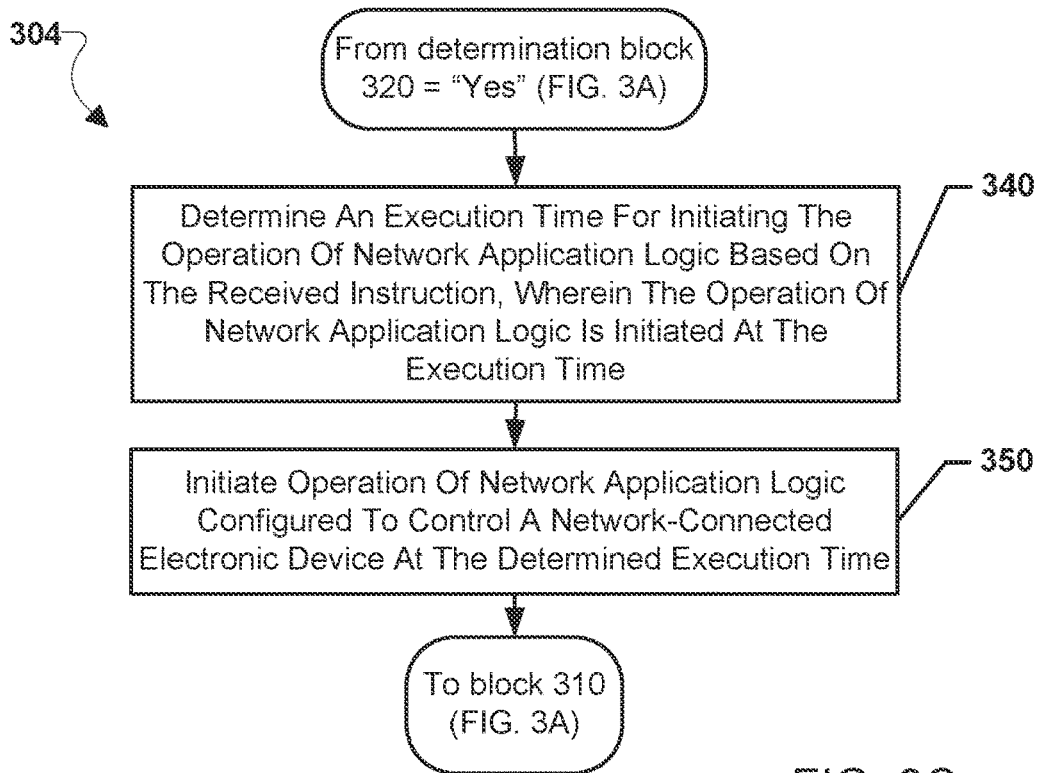

FIG. 3C illustrates an embodiment method 304 of example operations that may be performed as part of the method 300 (FIG. 3A) for initiating operation of network application logic. With reference to FIGS. 1-3D, the operations of method 304 may be performed by the processor (e.g., 121) of the computing device (e.g., 110, 120, 130) or server (e.g., programmer server 222, alternate content server 216, manifest manipulator server 214, origin server 212).

In some implementations, following the operations of determination block 320 (FIG. 3A) in which the processor determines that the media content includes content-type metadata that identifies the media content as a predetermined type of content. (i.e., determination block 320="Yes"), the processor may determine an execution time for initiating the operation of network application logic based on the received instruction, wherein the operation of the network application logic is initiated at the execution time, in block 340. The determination in block 340 may be performed by the network application logic scheduling module (e.g., 245). To make the determination in block 340, the processor may access a network application logic database that maintains data regarding the schedule and/or timing of suitable network application logic.

In block 350, the processor may initiate operation of network application logic configured to control a network-connected electronic device at the execution time determined in block 340. The initiation of the operation of network application logic in block 350 may be performed by the network application logic operation initiation module (e.g., 250). To initiate the operation of network application logic at the execution time, the processor may transmit a command or other signal to the network-connected electronic device (e.g., the smart-lighting system 150) or an intermediate computing device (e.g., the router 130) at the execution time. In addition, or alternatively, the initiation of the network application logic may include transmitting a signal to a network-connected electronic device at the execution time. The timing of the execution of the network application logic may be left to the network-connected electronic device or an intermediate computing device.

Following the operations in block 350, the processor may await receipt of an additional instruction related to the presentation of the selected media content configured to be consumed by the target consumer before repeating the operations in block 310 (FIG. 3A).

Figure 3D:
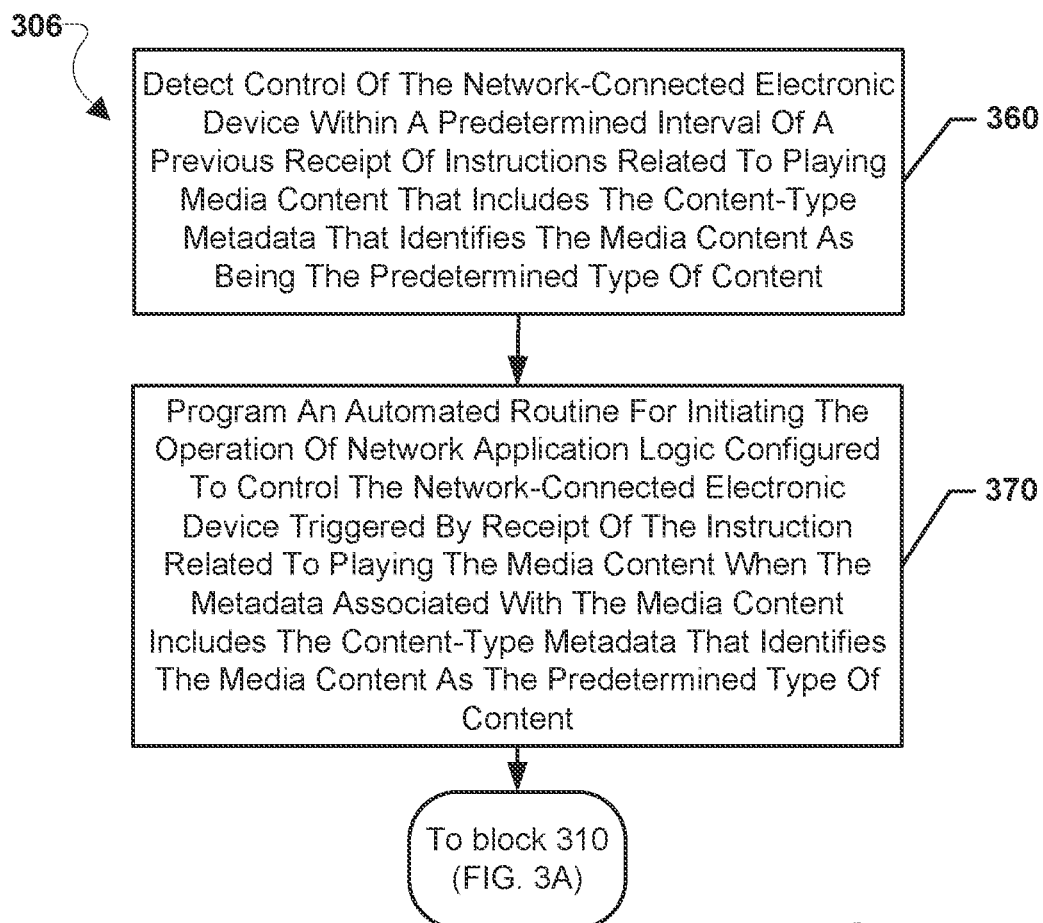

FIG. 3D illustrates an embodiment method 306 of example operations that may be performed as part of the method 300 (FIG. 3A) for initiating operation of network application logic. With reference to FIGS. 1-3D, the operations of method 306 may be performed by the processor (e.g., 121) of the computing device (e.g., 110, 120, 130) or server (e.g., programmer server 222, alternate content server 216, manifest manipulator server 214, origin server 212).

In block 360, the processor may detect control of the network-connected electronic device within a predetermined interval of a previous receipt of an instruction related to playing media content that includes the content-type metadata that identifies the media content as being the predetermined type of content. The detection in block 360 may be performed by the network-connected electronic device control detection module (e.g., 255). To detect this control of the network-connected electronic device, the processor may communicate with one or more network-connected electronic devices and/or an intermediate computing device (e.g., 130).

In block 370, the processor may program an automated routine for initiating the operation of network application logic that is configured to control the network-connected electronic device detected in block 360. The automated routine may be configured to trigger operation of the network application logic in response to future receipt of the instruction related to playing the media content when the metadata associated with the media content includes the content-type metadata that identifies the media content as the predetermined type of content. The programming in block 370 may be performed by the automated routing programming module (e.g., 260) in conjunction with the network application logic storage module (e.g., 265). In this way, the processor may store the automated routine in a storage device (e.g., 127) associated with the computing device (e.g., 120) and/or other storage device(s). In various embodiments, after or while storing the automated routine in the storage device, the processor may await receipt of an additional instruction related to the presentation of the selected media content configured to be consumed by the target consumer before repeating the operations in block 310 (FIG. 3A).

Figure 3E:
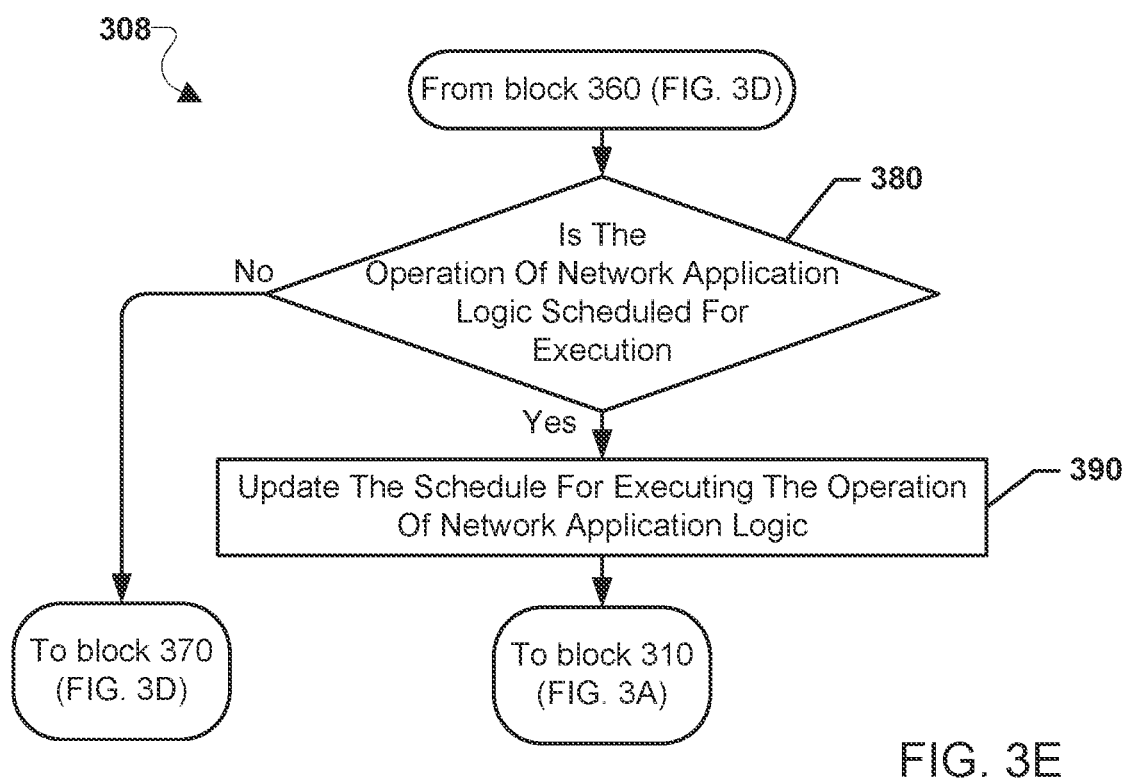

FIG. 3E illustrates an embodiment method 308 of example operations that may be performed as part of the method 306 (FIG. 3D) for initiating operation of network application logic. With reference to FIGS. 1-3B, the operations of method 308 may be performed by the processor (e.g., 121) of the computing device (e.g., 110, 120, 130) or server (e.g., programmer server 222, alternate content server 216, manifest manipulator server 214, origin server 212).

In some implementations, following the operations of block 360 (FIG. 3D), the processor may determine whether the operation of network application logic is scheduled for execution in determination block 380. The determination in determination block 380 may be performed by the network application logic execution scheduling module (e.g., 245). To make the determination in determination block 380, the processor may access the network application logic database that maintains data for one or more elements of suitable network application logic.

In response to determining that the operation of network application logic is not scheduled for execution (i.e., determination block 380="No"), the processor may program an automated routine for initiating the operation of network application logic that is configured to control the network-connected electronic device in block 370 (FIG. 3D).

In response to determining that the operation of network application logic is scheduled for execution (i.e., determination block 380="Yes"), the processor may update the schedule for executing the operation of network application logic in block 390. Updating the schedule for executing the operation of the network application logic, in block 390, may be performed by the network application logic execution scheduling module (e.g., 245).

Following the operations in block 390, the processor may await receipt of an additional instruction related to the presentation of the selected media content configured to be consumed by the target consumer before repeating the operations in block 310 (FIG. 3A).

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods 300, 302, 304, 306, 308 may be substituted for or combined with one or more operations of the methods 300, 302, 304, 306, 308 and vice versa.

Figure 4:
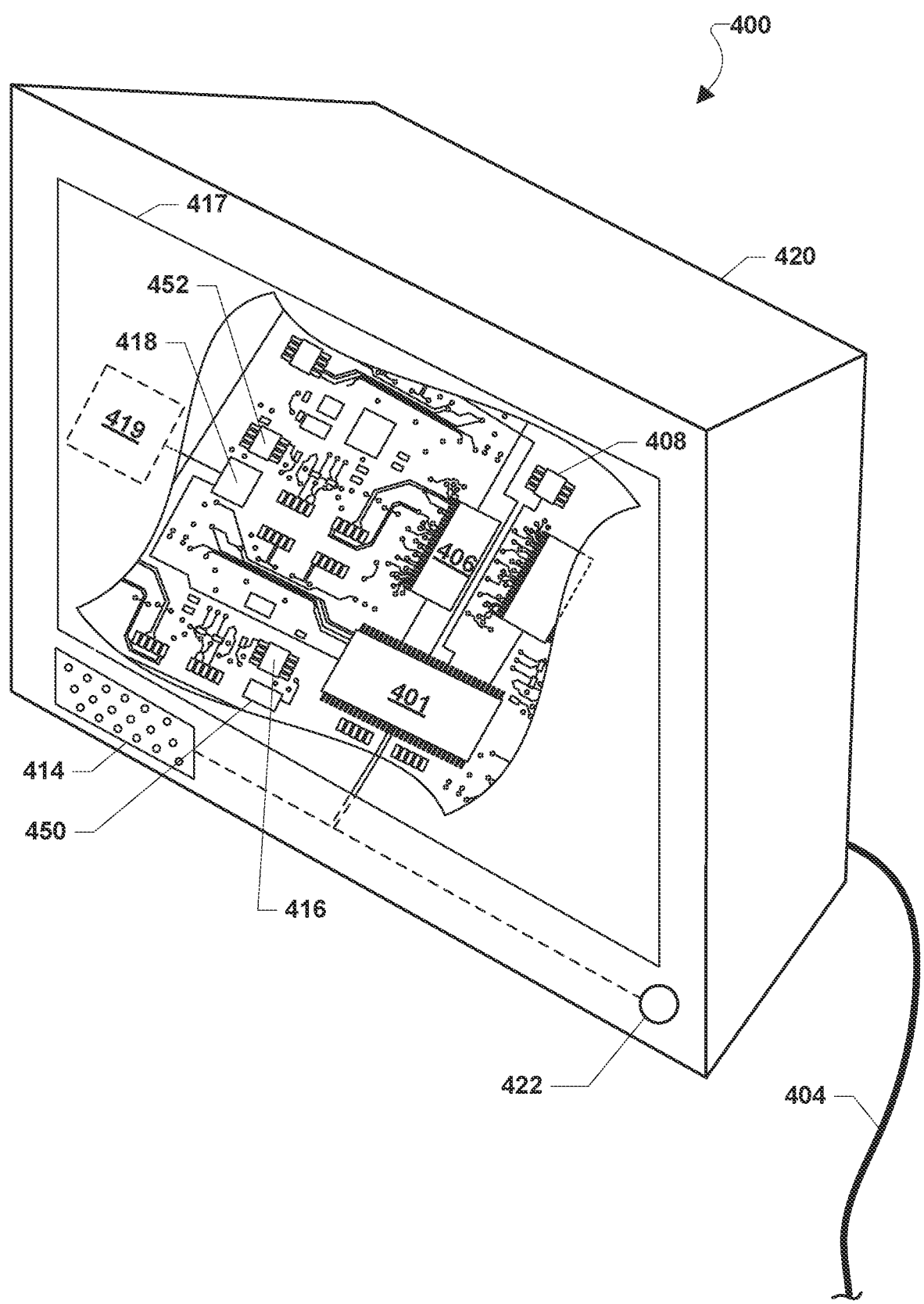
FIG. 4 is a component diagram of an example computing device suitable for use with various embodiments.

The various embodiments (including, but not limited to, embodiments discussed above with reference to FIGS. 1-3E), may be implemented in any of a variety of computing devices, including a smart television, an example of which is illustrated in FIG. 4. With reference to FIGS. 1-4, the smart television 400 may include a processor 401 and an internal memory 406. The processor 401 may be one or more multi-core integrated circuits designated for general or specific processing tasks. The internal memory 406 may be volatile or non-volatile memory and may also be secure and/or encrypted memory, or unsecure and/or unencrypted memory, or any combination thereof. In another embodiment (not shown), the smart television 400 may also be coupled to an external memory, such as an external hard drive. The smart television 400 may have one or more satellite, cable, or terrestrial tuners 408 coupled to the processor 401. The one or more tuners 408 may be used with the above-mentioned circuitry to receive and tune signals (e.g., television signals) received from a transmitter system (not shown) over a physical connection 404 (e.g., a connection to a cable network, a connection to an antenna, etc.). The tuner 408 and a connected antenna (internal to the television 400 or connected via physical connection 404 may be configured to receive IP streamed content.

The smart television 400 may have one or more radio signal transceivers 416 (e.g., Peanut®, Bluetooth®, Zigbee®, Wi-Fi, RF, cellular, etc.) and antennae 450, for sending and receiving, coupled to each other and/or to the processor 401. The transceivers 416 and antennae 450 may be used with the above-mentioned circuitry to implement various wireless transmission protocol stacks and interfaces. The smart television 400 may include one or more cellular network wireless modem chips 452, that enables communication via one or more cellular networks and that are coupled to the processor 401. The one or more cellular network wireless modem chips 452 may enable the smart television 400 to receive broadcast services from one or more cellular networks (e.g., CDMA, TDMA, GSM, PCS, 3G, 4G, LTE, or any other type of cellular network).

The smart television 400 may include a peripheral device connection interface 418 coupled to the processor 401. The peripheral device connection interface 418 may be singularly configured to accept one type of connection or may be configured to accept various types of physical and communication interfaces/connections, common or proprietary, such as USB, FireWire, Thunderbolt, or PCIe. The peripheral device connection interface 418 may also be coupled to a similarly configured peripheral device connection port (not shown), such as a connection port included on a conditional access module 419 in communication with the television 400.

The smart television 400 may also include speakers 414 for providing audio outputs. The smart television 400 may also include a housing 420, constructed of a plastic, metal, or a combination of materials, for containing all or some of the components discussed herein. The smart television 400 may be connected to a power source (not shown), such as a wall outlet. The smart television 400 may also include a physical button 422 for receiving consumer inputs. The smart television 400 may also include a display screen 417 coupled to the processor 401 and used for displaying visual images, such as television content, etc.

Figure 5:
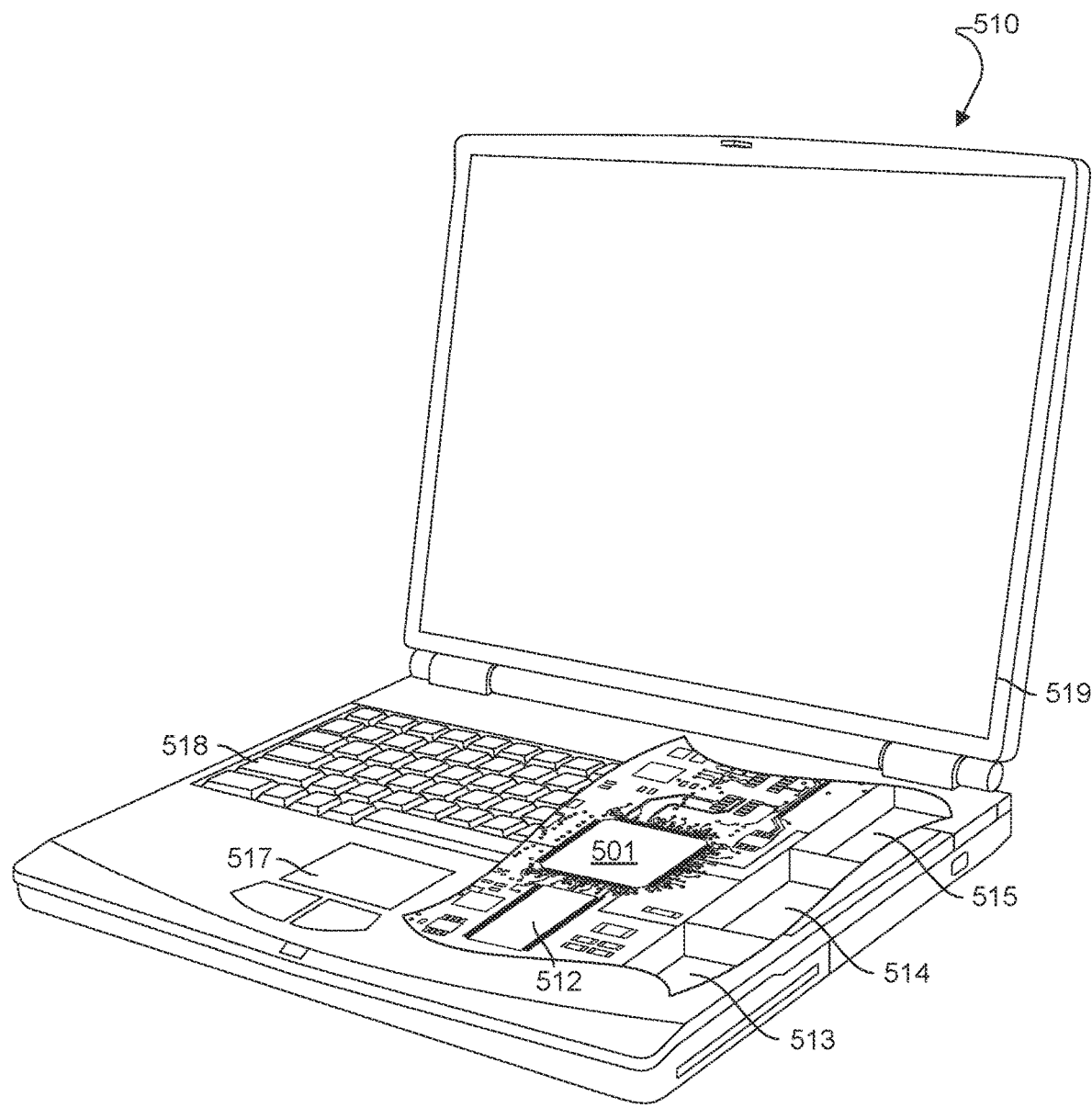
FIG. 5 is a component diagram of another example computing device suitable for use with various embodiments.

The various embodiments (including, but not limited to, embodiments discussed above with reference to FIGS. 1-4) described above may also be implemented within a variety of computing devices, such as a laptop computer 510 as illustrated in FIG. 5. With reference to FIGS. 1-5, many laptop computers may include a touch pad touch surface 517 that serves as the computer's pointing device, and thus may receive drag, scroll, and flick gestures similar to those implemented on mobile computing devices equipped with a touch screen display and described above. A laptop computer 510 will typically include a processor 501 coupled to volatile memory 512 and a large capacity nonvolatile memory, such as a disk drive 513 of Flash memory. The laptop computer 510 may also include a floppy disc drive 514 and a compact disc (CD) drive 515 coupled to the processor 501. The laptop computer 510 may also include a number of connector ports coupled to the processor 501 for establishing data connections or receiving external memory devices, such as a USB or FireWire® connector sockets, or other network connection circuits (e.g., interfaces) for coupling the processor 501 to a network. In a notebook configuration, the computer housing may include the touchpad 517, the keyboard 518, and the display 519 all coupled to the processor 501. Other configurations of the computing device may include a computer mouse or trackball coupled to the processor (e.g., via a USB input) as are well known, which may also be used in conjunction with the various embodiments.

Figure 6:
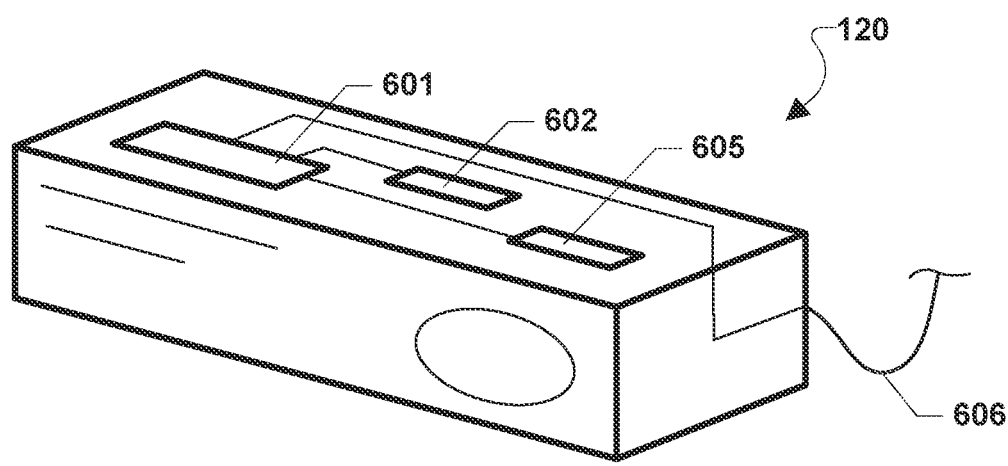
FIG. 6 is a component diagram of an example streaming media player suitable for use with the various embodiments.

The various embodiments (including, but not limited to, embodiments discussed above with reference to FIGS. 1-5) may also be implemented on any of a variety of computing devices, such as a set-top box, DVR, or other streaming media player, as illustrated in FIG. 6. With reference to FIGS. 1-6, a computing device 120 may include a processor 601 coupled to volatile memory 602. The computing device 120 may also include one or more connection or port 606 coupled to the processor 601 and configured to output streaming content to a display. The computing device 120 may also include one or more network transceivers 605, such as a network access port, coupled to the processor 601 for establishing wired or wireless network interface connections with a communication network, such as a local area network coupled to other computing devices and routers/switches, the Internet, the public switched telephone network, and/or a cellular network (e.g., CDMA, TDMA, GSM, PCS, 3G, 4G, LTE, or any other type of cellular network). The computing device 120 may receive media content via a network transceiver 605 and output the media content to a display via the connection or port 606.

Figure 7:
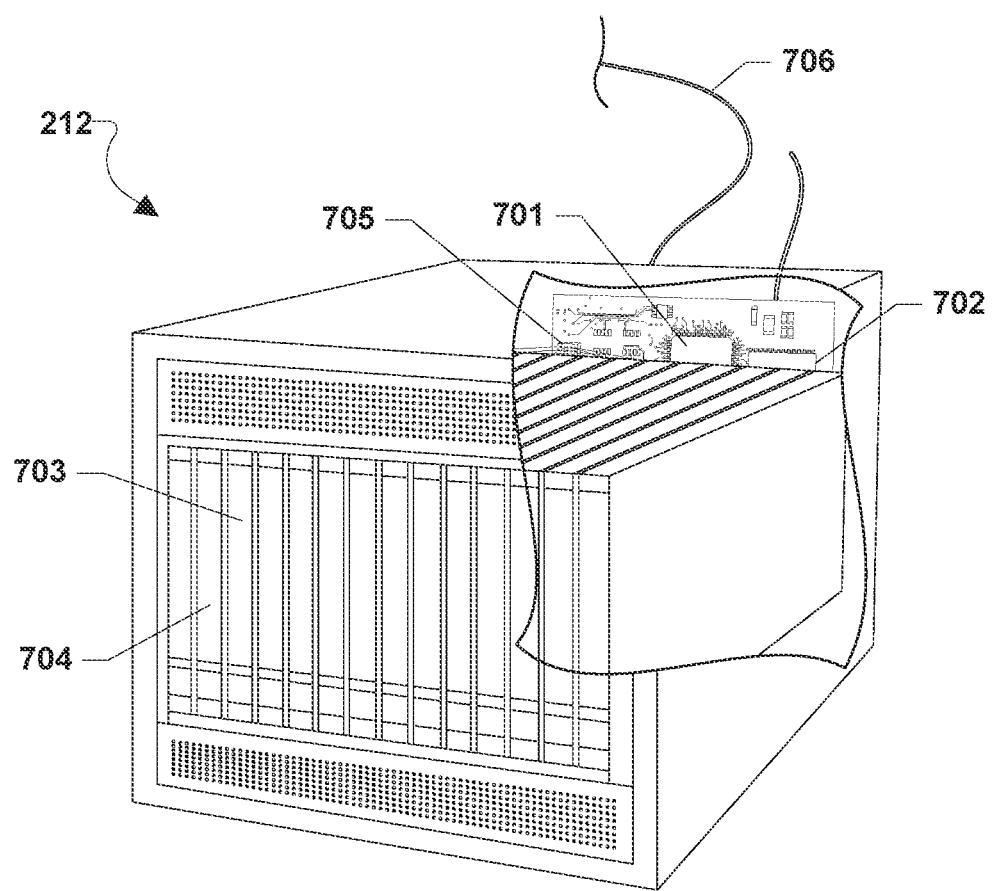
FIG. 7 is a component diagram of an example server suitable for use with the various embodiments.

Various embodiments (including, but not limited to, embodiments discussed above with reference to FIGS. 1-6) may be implemented on any of a variety of commercially available server devices, such as the server 212 illustrated in FIG. 7. With reference to FIGS. 1-7, the servers 214, 216, and 222 illustrated in FIG. 2 may include the same or similar elements as the server 212 The server 212 may include a processor 701 coupled to volatile memory 702 and a large capacity nonvolatile memory, such as a disk drive 703. The server 212 may also include a floppy disc drive, compact disc (CD) or DVD disc drive 704 coupled to the processor 701. The server 212 may also include network access ports 706 coupled to the processor 701 for establishing data connections with a network connection circuit 705 and a communication network (e.g., IP network) coupled to other communication system network elements.

The processors 121, 401, 501, 601, 701 may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory before they are accessed and loaded into the processors 121, 401, 501, 601, 701. The processors 121, 401, 501, 601, 701 may include internal memory sufficient to store the application software instructions. In many devices, the internal memory may be a volatile or nonvolatile memory, such as flash memory, or a mixture of both. For the purposes of this description, a general reference to memory refers to memory accessible by the processors 121, 401, 501, 601, 701 including internal memory or removable memory plugged into the device and memory within the processors 121, 401, 501, 601, 701 themselves.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a module may be, but is not limited to, a process running on a processor, a processor, an object, an executable, a thread of execution, a program, or a computer. By way of illustration, both an application running on a computing device and the computing device may be referred to as a module. One or more modules may reside within a process or thread of execution and a module may be localized on one processor or core or distributed between two or more processors or cores. In addition, these modules may execute from various non-transitory processor-readable storage media having various instructions or data structures stored thereon. Modules may communicate by way of local or remote processes, function or procedure calls, electronic signals, data packets, memory read/writes, and other known network, computer, processor, or process related communication methodologies.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module and/or processor-executable instructions, which may reside on a non-transitory computer-readable or non-transitory processor-readable storage medium. Non-transitory server-readable, computer-readable or processor-readable storage media may be any storage media that may be accessed by a computer or a processor. By way of example but not limitation, such non-transitory server-readable, computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, DVD, floppy disk, and Blu-ray disc where disks usually reproduce data magnetically, while discs reproduce data optically with lasers. Combinations of the above are also included within the scope of non-transitory server-readable, computer-readable and processor-readable storage media. Additionally, the operations of a method or algorithm may reside as one or any combination or set of codes and/or instructions on a non-transitory server-readable, processor-readable medium and/or computer-readable storage medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for initiating operation of network application logic by a processor of a computing device, comprising:
   detecting control of a network-connected electronic device within a predetermined interval of a previous receipt of instructions related to playing media content that includes content-type metadata that identifies the media content as being a predetermined type of content;
   programming an automated routine for initiating operation of network application logic configured to control the network-connected electronic device triggered by receipt of instruction related to playing the media content when metadata associated with selected media content includes the content-type metadata that identifies the selected media content as the predetermined type of content;
   receiving an instruction related to a presentation of the selected media content configured to be consumed by a target consumer;

determining whether the selected media content includes content-type metadata that identifies the selected media content as the predetermined type of content; and initiating operation of network application logic according to the programmed automated routine in response to determining the selected media content includes the content-type metadata that identifies the selected media content as the predetermined type of content.

2. The method of claim 1, wherein the received instruction includes a command to play, stop, pause, resume, fast-forward, rewind, or skip a segment of the selected media content.

3. The method of claim 1, wherein initiating operation of network application logic includes transmitting a signal to the network-connected electronic device.

4. The method of claim 1, wherein the predetermined type of content is one of a plurality of content types designated for initiating operations of network application logic.

5. The method of claim 1, wherein the operation of network application logic activates a network-connected switch.

6. The method of claim 1, wherein the network-connected electronic device includes a light that is controlled by the operation of network application logic.

7. The method of claim 1, further comprising:
determining which operation of network application logic is associated with the received instruction and the selected media content.

8. The method of claim 1, further comprising:
determining an execution time for initiating the operation of network application logic based on the received instruction, wherein the operation of network application logic is initiated at the execution time.

9. The method of claim 1, wherein the content-type metadata identifies the selected media content as a category of an expression of information that is readily perceived by the target consumer through multimedia.

10. The method of claim 1, further comprising:
determining whether the operation of network application logic is scheduled for execution; and
updating a schedule for executing the operation of network application logic in response to determining the operation of network application logic is scheduled for execution.

11. A computing device, wherein the computing device is connected to at least one network-connected electronic devices in a network, comprising:
a transceiver; and
a processor coupled to the transceiver, wherein the processor is configured with processor-executable instructions to perform operations for initiating operation of network application logic from the computing device, the operations comprising:
detecting control of a network-connected electronic device within a predetermined interval of a previous receipt of instructions related to playing media content that includes content-type metadata that identifies the media content as being a predetermined type of content; and
programming an automated routine for initiating the operation of network application logic configured to control the network-connected electronic device triggered by receipt of instruction related to playing the media content when metadata associated with selected media content includes the content-type metadata that identifies the selected media content as the predetermined type of content;
receiving, using the transceiver, an instruction related to a presentation of the selected media content configured to be consumed by a target consumer;
determining whether the selected media content includes content-type metadata that identifies the selected media content as the predetermined type of content; and
initiating operation of network application logic according to the programmed automated routine in response to determining the selected media content includes the content-type metadata that identifies the selected media content as the predetermined type of content.

12. The computing device of claim 11, wherein the processor is configured with processor-executable instructions to perform operations such that the received instruction includes a command to play, stop, pause, resume, fast-forward, rewind, or skip a segment of the selected media content.

13. The computing device of claim 11, wherein the processor is configured with processor-executable instructions to perform operations such that initiating operation of network application logic includes transmitting a signal to the network-connected electronic device.

14. The computing device of claim 11, wherein the processor is configured with processor-executable instructions to perform operations such that the predetermined type of content is one of a plurality of content types designated for initiating operations of network application logic.

15. The computing device of claim 11, wherein the processor is configured with processor-executable instructions to perform operations such that the operation of network application logic activates a network-connected switch.

16. The computing device of claim 11, wherein the processor is configured with processor-executable instructions to perform operations such that the network-connected electronic device includes a light that is controlled by the operation of network application logic.

17. The computing device of claim 11, wherein the processor is configured with processor-executable instructions to perform operations further comprising:
determining which operation of network application logic is associated with the received instruction and the selected media content.

18. The computing device of claim 11, wherein the processor is configured with processor-executable instructions to perform operations further comprising:
determining an execution time for initiating the operation of network application logic based on the received instruction, wherein the operation of network application logic is initiated at the execution time.

19. The computing device of claim 11, wherein the processor is configured with processor-executable instructions such that the content-type metadata identifies the selected media content as a category of an expression of information that is readily perceived by the target consumer through multimedia.

20. The computing device of claim 19, wherein the processor is configured with processor-executable instructions to perform operations further comprising:
determining whether the operation of network application logic is scheduled for execution; and
updating a schedule for executing the operation of network application logic in response to determining the operation of network application logic is scheduled for execution.

21. A non-transitory processor-readable storage medium having stored thereon processor-executable instructions configured to cause a processor to perform operations for initiating operation of network application logic from a computing device, the operations comprising:
  detecting control of a network-connected electronic device within a predetermined interval of a previous receipt of instructions related to playing media content that includes content-type metadata that identifies the media content as being a predetermined type of content;
  programming an automated routine for initiating the operation of network application logic configured to control the network-connected electronic device triggered by receipt of instruction related to playing the media content when metadata associated with selected media content includes the content-type metadata that identifies the selected media content as the predetermined type of content;
  receiving an instruction related to a presentation of the selected media content configured to be consumed by a target consumer;
  determining whether the selected media content includes content-type metadata that identifies the selected media content as the predetermined type of content; and
  initiating operation of network application logic the programmed automated routine in response to determining the selected media content includes the content-type metadata that identifies the selected media content as the predetermined type of content.

22. The non-transitory processor-readable storage medium of claim 21, wherein the processor is configured with processor-executable instructions to perform operations such that the received instruction includes a command to play, stop, pause, resume, fast-forward, rewind, or skip a segment of the selected media content.

23. The non-transitory processor-readable storage medium of claim 21, wherein the processor is configured with processor-executable instructions to perform operations such that initiating operation of network application logic includes transmitting a signal to the network-connected electronic device.

24. The non-transitory processor-readable storage medium of claim 21, wherein the processor is configured with processor-executable instructions to perform operations such that the predetermined type of content is one of a plurality of content types designated for initiating operations of network application logic.

25. The non-transitory processor-readable storage medium of claim 21, wherein the processor is configured with processor-executable instructions to perform operations such that the operation of network application logic activates a network-connected switch.

26. The non-transitory processor-readable storage medium of claim 21, wherein the processor is configured with processor-executable instructions to perform operations such that the network-connected electronic device includes a light that is controlled by the operation of network application logic.

27. The non-transitory processor-readable storage medium of claim 21, wherein the processor is configured with processor-executable instructions to perform operations further comprising:
  determining which operation of network application logic is associated with the received instruction and the selected media content.

28. The non-transitory processor-readable storage medium of claim 21, wherein the processor is configured with processor-executable instructions to perform operations further comprising:
  determining an execution time for initiating the operation of network application logic based on the received instruction, wherein the operation of network application logic is initiated at the execution time.

29. The non-transitory processor-readable storage medium of claim 21, wherein the processor is configured with processor-executable instructions to perform operations such that the content-type metadata identifies the selected media content as a category of an expression of information that is readily perceived by the target consumer through multimedia.

30. The non-transitory processor-readable storage medium of claim 29, wherein the processor is configured with processor-executable instructions to perform operations further comprising:
  determining whether the operation of network application logic is scheduled for execution; and
  updating a schedule for executing the operation of network application logic in response to determining the operation of network application logic is scheduled for execution.

* * * * *